D. L. FISH.
MEDICINE TAKING TIME INDICATOR.
APPLICATION FILED OCT. 26, 1920.

1,370,956.

Patented Mar. 8, 1921.

Inventor.
David L. Fish
by Seymour & Earle
Atty

UNITED STATES PATENT OFFICE.

DAVID L. FISH, OF NEW HAVEN, CONNECTICUT.

MEDICINE-TAKING-TIME INDICATOR.

1,370,956.     Specification of Letters Patent.     Patented Mar. 8, 1921.

Application filed October 26, 1920. Serial No. 419,563.

*To all whom it may concern:*

Be it known that I, DAVID L. FISH, a citizen of the United States, residing at New Haven, in the county of New Haven and State of Connecticut, have invented a new and useful Improvement in Medicine-Taking-Time Indicators; and I do hereby declare the following, when taken in connection with the accompanying drawings and the characters of reference marked thereon, to be a full, clear, and exact description of the same, and which said drawings constitute part of this application, and represent, in—

Figure 1:
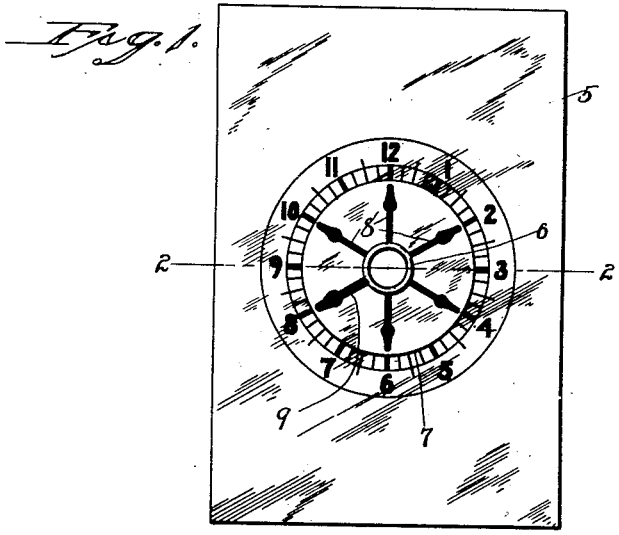

Figure 1, a face view of a medicine-taking time indicator constructed in accordance with my invention.

Figure 2:

Fig. 2, a sectional view on the line 2—2 enlarged.

Figure 3:
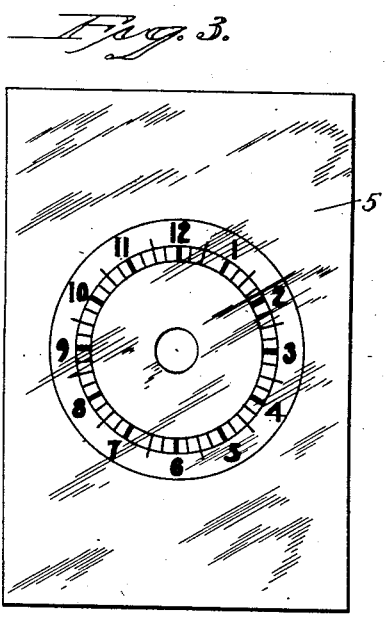

Fig. 3, a face view of the dial detached.

Figure 4:
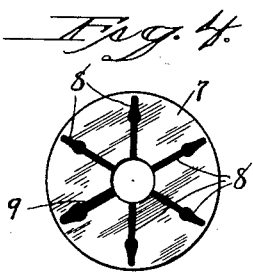

Fig. 4, a face view of the pointer disk detached.

This invention relates to an improvement in medicine-taking time indicators of the class which includes a dial representing the hours. In the usual construction of devices of this character it is necessary to set the indicator each time that the medicine is taken to indicate the time for taking the next dose.

The object of this invention is to provide an indicator which may be set once a day when the first dose is taken and which will unerringly and automatically indicate the time for taking the next successive doses during that day, and the invention consists in the construction and arrangement of parts as hereinafter described and particularly recited in the claims.

In carrying out my invention I employ a dial 5 which may be of any approved design adapted to be supported in the form of an easel, or to be secured to a bottle or box containing medicine as a part of a label. This dial is graduated to indicate twelve hours and these hours are subdivided into quarters. Secured to the dial by an eyelet 6 or other suitable means is a pointer disk 7 corresponding in diameter to the inner circle on the graduated dial, and printed on this pointer disk are the representations of pointers 8, equally spaced. As shown in the drawings, the pointer dial is provided with 6 pointers, one of them, 9, being heavier than the others. If the first dose of medicine is taken at eight o'clock in the morning, to be repeated every two hours thereafter, the pointer disk will be turned so that the heavy pointer 9 points to 8, as shown in Fig. 1 of the drawings. The remaining pointers then will be automatically set for each two hours through the remainder of the day. In other words, the dial in this case is divided into six sections. If the medicine is to be taken every three hours, a pointer disk will be provided having four pointers, or if once every four hours, a disk with three pointers will be used, and if every hour, a pointer disk with twelve pointers will be employed. In any case, when once set it indicates the time for taking the medicine throughout the day. As the pointers are printed on the disk, there is no danger of their becoming disarranged or broken. The device is therefore very simple in construction and can be produced at very low cost so that the dial plate might be used for advertising purposes.

I claim:

1. A medicine-taking time indicator comprising a dial indicating hours and divisions thereof arranged in a circle thereon, a pointer disk pivotally connected with said dial in the center of said circle and adapted to be turned with relation thereto, said pointer disk bearing the representation of a plurality of pointers equally spaced with relation to each other, and the representation of one pointer distinguished from the others.

2. A medicine-taking time indicator comprising a dial indicating hours and divisions thereof arranged in a circle, a pointer disk pivotally connected with said dial in the center of said circle and adapted to be turned with relation thereto, said pointer disk bearing the representation of a plurality of pointers equally spaced with relation to each other.

In testimony whereof, I have signed this specification in the presence of a subscribing witness.

DAVID L. FISH.

Witness:
FREDERIC C. EARLE.